United States Patent [19]

Weiss et al.

[11] 4,258,583
[45] Mar. 31, 1981

[54] DRIVE MECHANISM FOR ROTARY DRUM

[75] Inventors: Hermann Weiss, Kaarst, Fed. Rep. of Germany; Ernst Stockhammer, Linz, Austria

[73] Assignees: Atec-Weiss KG, Kaarst, Fed. Rep. of Germany; Vereinigte Osterreichische Eisen- und Stahlwerke Alpin Montang Aktiengesellschaft, Linz, Austria

[21] Appl. No.: 960,482

[22] Filed: Nov. 13, 1978

[51] Int. Cl.³ .................... F16H 55/17; F16H 57/00
[52] U.S. Cl. ........................................ 74/414; 74/411; 74/446; 432/103
[58] Field of Search ............ 74/411, 414, 431–434, 74/439, 446, 448, 449; 165/8; 432/103

[56] References Cited

U.S. PATENT DOCUMENTS

| | | | |
|---|---|---|---|
| 2,399,122 | 4/1946 | Johnson | 74/446 |
| 3,241,387 | 3/1966 | Puhringer | 74/411 |
| 3,299,729 | 1/1967 | Durand | 74/411 |
| 3,461,848 | 8/1969 | Bensinger | 74/411 X |
| 3,897,819 | 8/1975 | Huebner et al. | 165/8 |
| 3,927,575 | 12/1975 | Durand | 74/411 X |
| 4,071,961 | 2/1978 | Dietzel et al. | 74/414 X |
| 4,151,873 | 5/1979 | Lewakowski | 165/8 |

FOREIGN PATENT DOCUMENTS

| | | | |
|---|---|---|---|
| 924077 | 2/1955 | Fed. Rep. of Germany | 432/103 |
| 785050 | 4/1960 | France | 74/411 |
| 257937 | 5/1971 | U.S.S.R. | 74/443 |
| 330322 | 10/1972 | U.S.S.R. | 74/434 |
| 478984 | 10/1975 | U.S.S.R. | 432/103 |

*Primary Examiner*—Lawrence J. Staab
*Attorney, Agent, or Firm*—McAulay, Fields, Fisher, Goldstein & Nissen

[57] ABSTRACT

A drive mechanism for a rotary drum having a toothed ring which is disposed on the outer periphery thereof with a clearance in relation to the drum and which meshes with a drive pinion, the toothed ring is secured to a cylindrical support arranged concentrically to and with a clearance from the drum, and mutually spaced circumferential portions of the cylindrical support are respectively secured to the drum and to the toothed ring, the support being elastically flexible whereby the toothed ring is able to move radially of the drum with flexure of the support. The toothed ring is held in mesh with the drive pinion by guide and support elements which are disposed at the same radial distance from the drive pinion axis but which are angularly spaced about the axis and bear on an inner peripheral surface of the toothed ring.

8 Claims, 3 Drawing Figures

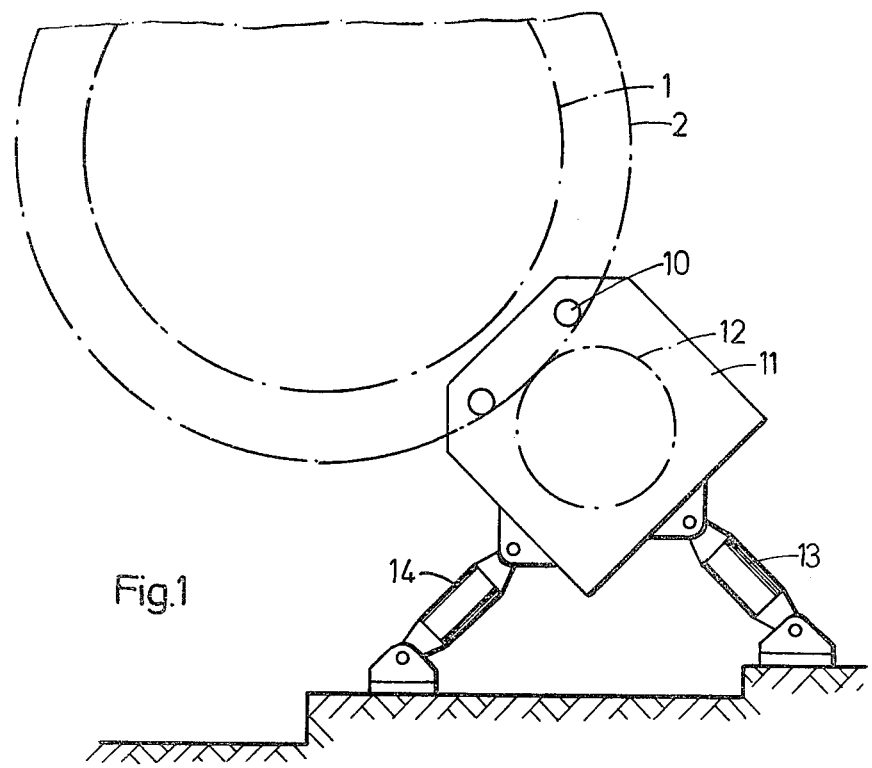
Fig.1
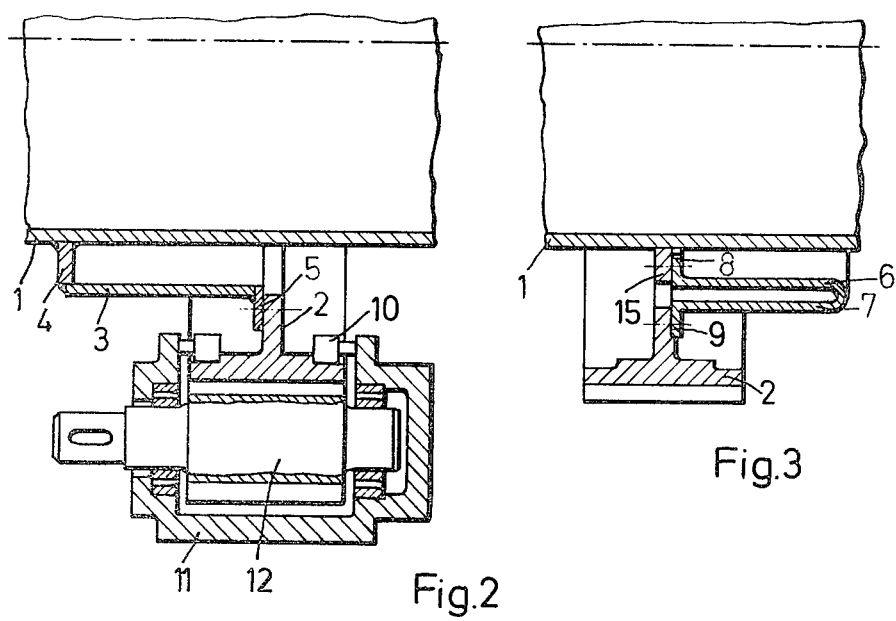
Fig.2
Fig.3

DRIVE MECHANISM FOR ROTARY DRUM

This invention relates to a drive mechanism for rotary drums, especially for example, rotary kilns and rotary tubular cement mills, and to rotary drums provided with drive mechanisms for their rotation.

Such drive mechanisms are known in which a drive pinion meshes with a toothed ring disposed on the outer periphery of the drum and with a clearance in relation to said drum, said toothed ring being secured to the drum in such a manner that it is movable with respect to the drum in the radial direction against resilient means.

In the case of large diameter driven cylindrical drums, which are for example used in rotary kilns or rotary tubular cement mills, deformations occur in the drum due to heat and other loads. Irregular oval deformations can be found in rotary kilns. In order to prevent these deformations from affecting the toothed ring, the latter has only been connected with the drum at a few points by screwbolted devices. This type of securing, however, does not give the toothed ring a guidance which is sufficiently exact for the drive with sufficient freedom of movement of the drum. An exact guidance is necessary for the teeth to mesh with the pinion. Moreover, deformation of the toothed ring due to deformation in the drum can not be completely avoided in spite of the limited direct connection between the toothed ring and drum.

In U.S. Pat. No. 2,399,122, loads from the drum onto the toothed ring are prevented by the toothed ring being arranged with a radial clearance and being connected to the cylindrical drum by means of resilient bars, which are arranged so as to be distributed over the periphery and to lie at an incline. The high expense of manufacture connected with the bars is of disadvantage in this. The further problem of how to keep the toothed ring in mesh with the drive pinion despite the radial displaceability of the toothed ring in relation to the drum is not solved by this construction.

Runner rings for rotating drums, in particular rotary kilns, are known (German patent No. 924 077) in which the runner rings are connected to the drum by a short cylinder arranged at a spacing from the drum, that is to say, one end edge of the short cylinder is connected to the drum and the other end edge to the runner ring so that the revolving drum can move in a radial direction in relation to the runner ring due to the radial elasticity of the short cylinder. Radial forces issuing from the drum or the runner ring are therefore absorbed by the radially elastic cylinder and are not transferred to the runner ring or the drum respectively.

According to the present invention, there is provided a rotary drum having a drive mechanism comprising a toothed ring which is disposed on the outer periphery of the drum and with a clearance in relation to said drum and which meshes with a drive pinion, said toothed ring being secured to a cylindrical support arranged concentrically to and with a clearance from said drum, mutually spaced circumferential portions of the cylindrical support being respectively secured to the drum and to said toothed ring, said support being elastically flexible whereby the toothed ring is able to move radially of the drum with flexure of said support, the toothed ring being held in mesh with the drive pinion by guide and support elements which are disposed at the same radial distance from the drive pinion axis but which are angularly spaced about said axis and bear on an inner peripheral surface of the toothed ring.

The cylindrical support may be employed to ensure a rigid connection between the drum and the toothed ring in the direction of rotation and axial indisplaceability of the toothed ring on the drum. Deformations in the drum may be absorbed by the cylindrical support so that the toothed ring retains its shape. It can be ensured by the guidance of the inner periphery or rear of the toothed ring and by its radially flexible connection with the drum that the teeth of the toothed ring and the drive pinion intermesh in an optimum manner.

The cylindrical support can comprise a single cylindrical ring. In this case the contact zones of the support on the drum and on the toothed ring are mutually axially offset. According to one form of the invention, however, it is also possible for the cylindrical support to comprise two radially spaced parts arranged concentrically one within the other and which are connected to one another at one axial end region while their opposite axial end regions are secured to the drum and to toothed ring respectively. It is possible in this case to arrange that the contact zones with the toothed ring and the drum are axially adjacent. This form of construction also permits greater flexibility of the cylindrical support within a given axial extent.

With a toothed ring which is T-shaped in cross-section the guide and support elements, which may be in the form of rollers, are preferably on both sides of the upright of the section. In this way symmetrical support and loading can be achieved.

According to a further preferred feature of the invention, the guide and support elements are disposed and secured in and on the same frame which is supported by guide elements arranged to cushion radial and tangential forces. The length of at least one of said guide elements, particularly a guide element arranged to cushion the radial forces, can be adjustable.

The invention will be described in more detail with reference to the accompanying drawing by way of example. In the drawing:

FIG. 1 shows a schematic front view of a drum provided with a drive mechanism according to the invention, FIG. 2 shows an axial section through the drive mechanism of FIG. 1, and FIG. 3 shows a cylindrical support for the drive mechanism different from that shown in FIG. 2.

As shown in the drawing, a toothed ring 2 is connected through a cylindrical support 3 to a drum 1 to be disposed concentrically to and at a radial spacing from the drum 1. In the embodiment shown in FIG. 2 the support 3 is a single cylindrical ring. One end is secured to the drum 1 through welded spacer elements 4, while the other end has a welded flange 5 onto which the toothed ring 2 is bolted. In the embodiment shown in FIG. 3 the support is composed of two cylindrical ring parts 6, 7 spaced one within the other, which are connected to one another at one axial end and which have respectively an inwardly and an outwardly directed flange 8, 9 at their other axial ends, by which flanges one is bolted onto a flange 15 welded onto the drum 1, and the other onto the toothed ring 2.

The toothed ring 2 is T-shaped in cross-section in both examples shown. Two guide and support rollers 10 run on the inner periphery on opposite sides of the upright of said T-shape. The support rollers 10 are disposed in a housing 11 and a drive pinion 12 meshing with the toothed ring 2 is also disposed in the housing 11. The guide and support rollers 10 are spaced angularly with respect to the axis of the drive pinion and in such a way that their axes are symmetrically disposed with respect to the line joining the centres of the toothed ring 2 and the pinion 12.

The housing 11 is supported by means 13, 14 in the form of guide elements. The element 13 is in alignment with the aforementioned centre-joining line so that it is able to absorb radial forces on the housing, whereas the support 14 runs parallel to a tangent to the pitch circles of the toothed ring 2 and the drive pinion 12 at their point of mesh. Preferably the length of the guide elements, particularly the radial guide element 13, is made adjustable.

Meshing between the toothed wheel 2 and pinion 12 in a manner which deformations in the drum 1 will not affect disadvantageously is ensured by the radially elastic but tangentially and axially rigid connection 3 or 6,7 between the toothed ring 2 and the drum 1 and by the guidance of the pinion 12 that is effected by the support rollers 10. The housing 11 can move to a certain extent in axial direction together with the guide and support rollers 10 as well as the pinion 12 together with the toothed ring 2 without the correct engagement of the toothed wheel 2 and pinion 12 having to be lost.

We claim:

1. A drive mechanism for a rotary drum comprising a toothed ring disposed on the outer periphery of said drum and having a clearance in relation to said drum,
   a drive pinion meshing with said toothed ring,
   a cylindrical support arranged concentrically to and with a clearance from said drum, said toothed ring being secured to said cylindrical support,
   mutually spaced circumferential portions of said cylindrical support being respectively secured to the drum and to said toothed ring,
   said support being eleastically flexible whereby the toothed ring is able to move radially of the drum with flexure of said support,
   guide and support elements for holding said toothed ring in mesh with said drive pinion, said guide and support elements being disposed at the same radial distance from the drive pinion axis but which are angularly spaced about said axis and bear on an inner peripheral surface of said toothed, and
   said drive pinion and said guide and support elements are disposed in a housing which is supported by means arranged to cushion radial and tangential forces thereon.

2. A drive mechanism according to claim 1, wherein said cylindrical support comprises two parts arranged concentrically at a radial spacing from one another, and
   each said parts being connected to the other at one axial end region and at their opposite axial end regions, one said part being secured to said drum and the other said part being secured to said toothed ring.

3. A drive mechanism according to claim 1 or 2 wherein said toothed ring has a T-shaped cross-section, and said guide and support elements are arranged at both sides of the upright of said T-shaped cross-section.

4. A drive mechanism according to claim 1 or 2 wherein said guide and support elements are rollers.

5. A drive mechanism according to claim 1, wherein said drive pinion and said guide and support elements are linked to a mounting and including means to cushion radial and tangential forces on said drive pinion and said guide and support elements.

6. A drive mechanism according to claim 5, wherein said cushioning means comprises guide elements, and the length of at least one of said guide elements is adjustable.

7. A drive mechanism according to claim 1, wherein said housing includes means for linking said drive pinion and said guide and support element.

8. A drive mechanism according to claim 1, wherein said housing includes means to mount said drive pinion and said guide and support elements.

* * * * *